United States Patent
Hanson et al.

(10) Patent No.: US 12,326,372 B2
(45) Date of Patent: Jun. 10, 2025

(54) TEST METHODOLOGY TO DETERMINE POWER OUPUT OF A THERMISTOR UNDER A DEFINED THERMAL LOAD

(71) Applicant: Rosemount Aerospace Inc., Burnsville, MN (US)

(72) Inventors: Daniel Hanson, Shakopee, MN (US); Richard Alan Schwartz, Faribault, MN (US); Alexandra C. Jenkins, Prior Lake, MN (US); Luke Anderson, Plymouth, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 745 days.

(21) Appl. No.: 17/456,234

(22) Filed: Nov. 23, 2021

(65) Prior Publication Data

US 2022/0268645 A1  Aug. 25, 2022

Related U.S. Application Data

(60) Provisional application No. 63/153,627, filed on Feb. 25, 2021.

(51) Int. Cl.
    *G01K 15/00* (2006.01)
    *G01K 7/22* (2006.01)
(52) U.S. Cl.
    CPC ............. *G01K 15/007* (2013.01); *G01K 7/22* (2013.01)
(58) Field of Classification Search
    CPC .................................. G01K 15/007; G01K 7/22
    See application file for complete search history.

(56) References Cited

U.S. PATENT DOCUMENTS

| | | | |
|---|---|---|---|
| 3,316,076 A | 4/1967 | Blackman | |
| 4,050,289 A | * 9/1977 | Fairbairn | ............... G01K 15/00 374/3 |
| 7,367,712 B2 | 5/2008 | Becker et al. | |
| 10,578,479 B2 | 3/2020 | Walker | |

(Continued)

FOREIGN PATENT DOCUMENTS

| | | | |
|---|---|---|---|
| CN | 202870185 U | 4/2013 | |
| CN | 106124969 A | 11/2016 | |
| CN | 110057472 A | * 7/2019 | ........... G01K 15/007 |

(Continued)

OTHER PUBLICATIONS

Extended European Search Report for EP Application No. 22158850.2, Dated Aug. 4, 2022, pp. 10.

*Primary Examiner* — Mirellys Jagan
(74) *Attorney, Agent, or Firm* — Kinney & Lange, P.A.

(57) ABSTRACT

A methodology includes circulating a temperature-controlled and flow-rate-controlled medium through a container at a controlled flow rate and submerging a thermistor with the medium. With the thermistor submerged, a power output of the thermistor is determined and compared to a power criterion, after which classification of the thermistor occurs based on a comparison of the power output to the power criterion. The methodology can include submerging a reference thermistor within the medium and determining a reference power output of the reference thermistor with the reference thermistor submerged within the medium, the power criterion determined based on the reference power output.

19 Claims, 5 Drawing Sheets

(56) References Cited

U.S. PATENT DOCUMENTS

2003/0012254 A1* 1/2003 Park .................. G01K 15/00
 374/45
2020/0088786 A1 3/2020 Su et al.

FOREIGN PATENT DOCUMENTS

EP 3379221 A1 * 9/2018 ........... G01K 15/002
WO 2006004559 A1 1/2006

* cited by examiner

TEST METHODOLOGY TO DETERMINE POWER OUPUT OF A THERMISTOR UNDER A DEFINED THERMAL LOAD

CROSS-REFERENCE TO RELATED APPLICATION(S)

This application claims the benefit of U.S. Provisional Application No. 63/153,627 filed Feb. 25, 2021 for "TEST METHODOLOGY TO DETERMINE POWER OUTPUT OF A THERMISTOR UNDER A DEFINED THERMAL LOAD" by D. Hanson, R. A. Schwartz, A. C. Jenkins and L. Anderson

BACKGROUND

Thermistors are components characterized by an electrical resistance that varies as a function of temperature, which are divided into two categories: positive temperature coefficient resistors and negative temperature coefficient resistors. Within an operational temperature range of thermistors, an electrical resistance of positive temperature coefficient resistors or PTCRs increases as the temperature of the PTCR increases while the electrical resistance of negative temperature coefficient resistors or NTCRs decreases as the temperature of the NTCR decreases. Some thermistors, for example PTCRs, are characterized by a switching temperature, also referred to as a breakpoint temperature or critical temperature, marking a boundary of the operational range of the thermistor. Typically, the switching temperature is defined as a temperature of the thermistor at which the electrical resistance of the thermistor is either 1) a multiple of the minimum electrical resistance of the thermistor or 2) a multiple of the electrical resistance of the thermistor at 25° C. The switching temperature of the thermistor depends on its material composition and manufacturing process used to produce the thermistor and, accordingly, can vary over a large range. Various methods to verify electrical properties of thermistors have included measuring an electrical resistance of the thermistor at 25° C. or measuring a surface temperature under a particular thermal load. However, these techniques query only a single point of the thermistor's temperature-resistance relationship, which fail to identify thermistors with diverging temperature-resistance relationships. Moreover, the current techniques do not verify the performance of thermistors under expected operational conditions. Accordingly, a new test methodology is needed to evaluate thermistor performance under a defined thermal load.

SUMMARY

In an exemplary embodiment in accordance with this disclosure, a method includes circulating a temperature-controlled and flow-rate-controlled medium through a container and submerging an electrically-energized thermistor within the medium. The method further includes determining a power output of the thermistor while the thermistor is submerged within the medium and classifying the thermistor based on a comparison between the determined power output and a power criterion.

In a further exemplary embodiment in accordance with this disclosure, the method includes submerging an electrically-energized reference thermistor within the medium and determining a reference power of the reference thermistor while the reference thermistor is submerged within the medium. Additionally, the method includes determining the power criterion based on the reference power of the reference thermistor.

DETAILED DESCRIPTION

As disclosed herein is a methodology for validating power output of thermistors, and more particularly, positive temperature coefficient resistors or PTCRs. The method includes circulation of a temperature-controlled, electrically-insulating medium through a container at a controlled flow rate and determining a power of the thermistor while the electrically-energized thermistor is submerged within the circulating medium. A power meter calculates thermistor power via a four-wire connection in which a first pair of leads supplies a constant voltage to the thermistor while facilitating current measurement through the power meter. A second pair of leads measures the precise voltage at the thermistor electrodes. Circulating the temperature-controlled medium through the container allows a temperature of the medium and a temperature of the electrically-powered thermistor to reach steady state before calculating thermistor power. Moreover, the medium temperature can be controlled by heating or cooling the medium with a heating element or heat exchanger, or a combination of these techniques. Because thermistor power is measured while the thermistor is exposed to a known, steady-state temperature of the controlled-circulation medium, thermistor power output can be determined while under a defined thermal load. Furthermore, variances in thermistor operation can be reduced for operation under a particular thermal load by determining thermistor power output of each thermistor within batches of thermistors produced by a particular manufacturing process and with a particular thermistor composition.

Figure 1A:
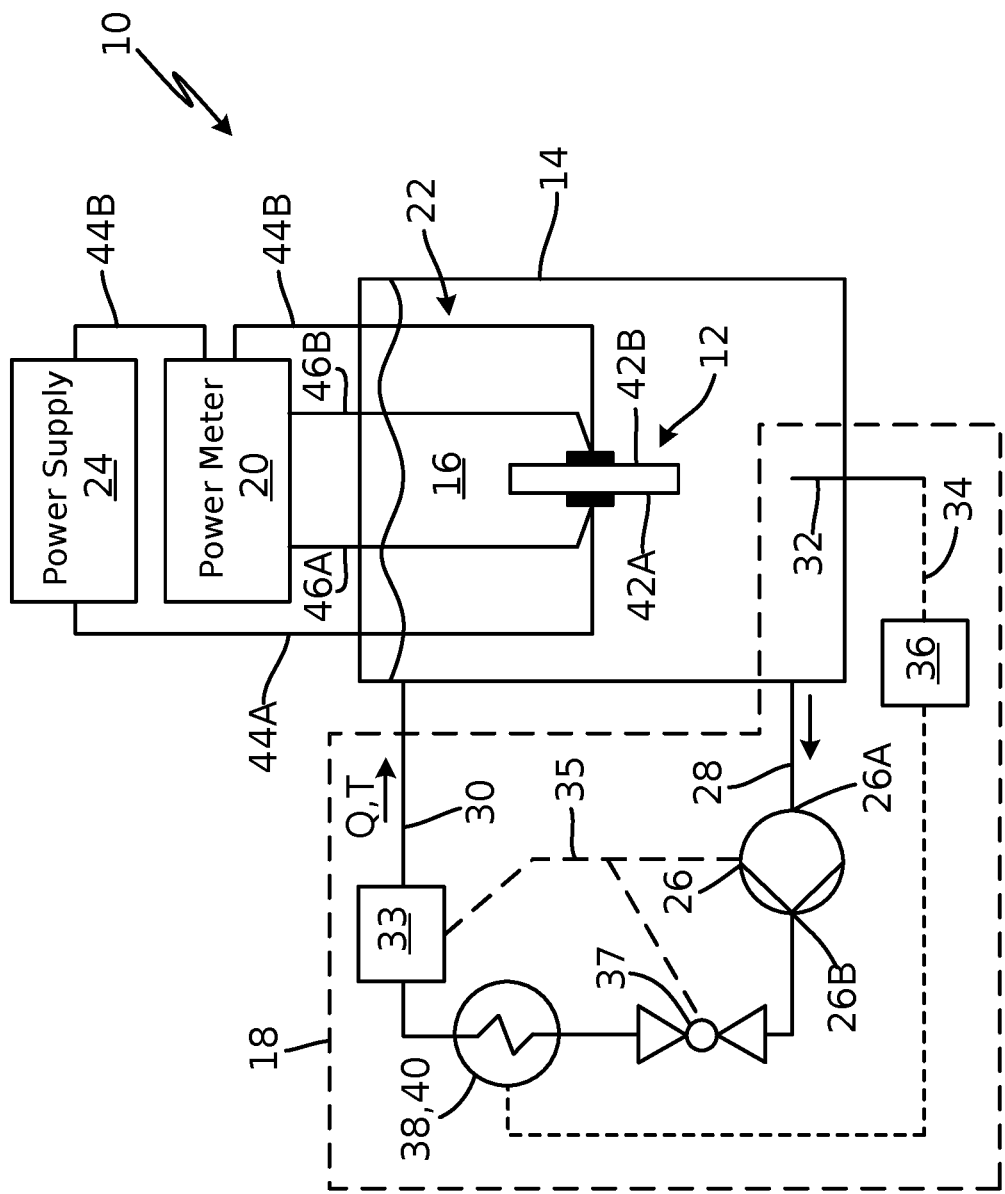
FIG. 1A is a schematic view of a system capable of implementing a test methodology for determining the power output of a thermistor using a four-wire connection.

FIG. 1A is a schematic of system 10 for implementing a methodology for testing or verifying power output of thermistor 12. System 10 includes container 14, medium 16, circulating system 18, power meter 20, four-wire connection 22, and power supply 24. Container 14 can be any vessel of suitable size and shape to contain one or more thermistors 12, a quantity of medium 16, and four-wire connection 22. Circulating system 18 includes pump 26 having inlet 26A communicating with container 14 via suction line 28 and outlet 26B communicating with container 14 via discharge line 30. Power meter 20 can be any commercially-available power meter capable of measuring electrical current and voltage via four-wire connection 22 while power supply 24 can be any commercially-available power supply capable of providing a regulated or constant supply voltage Vs to thermistor 12. Typically, power supplies capable of providing supply voltage Vs+/−5% are considered suitable for the following test methodology.

In operation, pump 26 receives medium 16 through suction line 28 and delivers medium 16 to container 14 through discharge line 30 to thereby circulate medium 16 through container 14 at flow rate Q and temperature T. Circulating system 18 includes additional components to regulate flow rate Q and temperature T of medium 16. For instance, circulating system 18 can include temperature sensor 32 positioned within container 14 to sense temperature T of medium 16 and flow rate sensor or meter 33 positioned along discharge line 30 to sense flow rate Q. Signal 34 of temperature sensor 32 varies in proportion to temperature T of medium, and signal 35 of flow rate sensor 33 varies in proportion to flow rate Q. Signal 35 can be provided directly to pump 26 or via controller 36 to vary operation of pump 26 in response to signal 35. In some instances, pump speed and, consequently, flow rate Q can be increased or decreased in proportion to signal 35. In other embodiments, pump 26 may operate at a constant speed. In these embodiments, circulating system 18 can include flow control valve 37 positioned along discharge line 30. Flow control valve 37 varies a valve element position and thereby varies an open area of valve 37 in proportion to signal 35, and thereby regulating flow rate Q delivered to container 14. Further, circulating system 18 can include heating element 38 or heat exchanger 40 to heat or cool medium 16, as the case may be, to regulate temperature T of medium 16 in proportion to signal 34. Using circulating system 18, flow rate Q and temperature T of medium 16 can be controlled to a flow rate setpoint and a temperature setpoint of medium 16.

Medium 16 is an electrically-insulating and thermally-conducting medium. Examples of medium 16 include fluids with the following properties at 25° C.: a thermal conductivity of 0.03 W/m-K or greater and a dielectric strength of 20 kV or greater across a 2.54 mm gap. In some embodiments, the thermal conductivity is between 0.057 W/m-K and 0.075 W/m-K, and the dielectric strength is between 30 kV and 70 kV across a 2.54 mm gap, each evaluated at 25° C. Fluids with these properties may have a liquid density at 25° C. that is greater than or equal to 1400 kg/m$^3$ and less than or equal to 1860 kg/m$^3$ and a specific heat at 25° C. that is greater than or equal to 1038 J/kg-K and less than or equal to 1319 J/kg-K.

Additionally, while properties of medium 16 may vary with a temperature of medium 16, fluids with operational ranges from −120° C. to +70° C. have been found to be acceptable for applications in which a temperature of medium 16 is less than or equal to 0° C. For applications in which a temperature of medium 16 is greater than 0° C., fluids with operational ranges from −30° C. to 140° C. have been found to be acceptable. Within these temperature ranges, fluids with thermal conductivity, specific heat, and liquid density properties which vary by no more than 25% of the respective values at 25° C. have found to be acceptable for medium 16. In some instances, these properties vary by less than 10% of the respective values at 25° C. while in others, these properties vary by less than 5% of the respective values at 25° C.

Four-wire connection 22 includes two pairs of leads, each pair configured to contact each of surfaces 42A and 42B of thermistor 12. For instance, FIG. 1 depicts four-wire connection 22 with leads 44A and 44B electrically connecting power supply 24 to thermistor 12 in which lead 44A contacts surface 42A and lead 44B contacts surface 42B. Power meter 20 is connected in-line along lead 44B. Similarly, four-wire connection 22 includes leads 46A and 46B electrically connecting power meter 20 to thermistor 12, lead 46A contacting surface 42A and lead 46B contacting surface 42B. As shown, power supply 24 provides supply voltage $V_s$ to thermistor 12 while thermistor 12 is submerged within medium 16, and power meter 20 senses supply voltage $V_s$ as well as electrical current I at thermistor 12 due to supply voltage $V_s$. Power meter 20 determines power output P of thermistor 12 based on voltage $V_s$ sensed via leads 46A and 46B and electrical current I sensed along lead 44B. Further, power meter 20 records and/or outputs power P of thermistor 12 for evaluation.

Thermistor 12 is a semiconductor component made of metallic oxides intermixed with binders and stabilizers that is pressed into a wafer, molded to a net shape, processed, and, in some instances, cut to a desired size and shape. The specific ratio of the material constituents of thermistor 12, the manufacturing process used to produce thermistor 12, and to some extent the size and shape of thermistor determine a relationship between electrical resistance and a bulk temperature of thermistor 12. In the following examples, thermistor 12 is a positive temperature coefficient resistor or PTCR.

Each thermistor 12 includes surfaces 42A and 42B forming opposite faces of thermistor 12. A distance between surfaces 42A and 42B perpendicular to at least one of surfaces 42A and 42B defines a thickness of thermistor 12. The periphery of each thermistor 12 is characterized by a shape, which in this instance is circular. However, thermistors 12 can take any convenient peripheral shape including circular, rectangular, square, triangular, trapezoidal, elliptical, or any other conceivable polygonal or free-form, closed-end shape. In some instances, a portion of the peripheral edge can be contoured or curved, forming a convex or concave portion of the periphery.

Figure 1B:
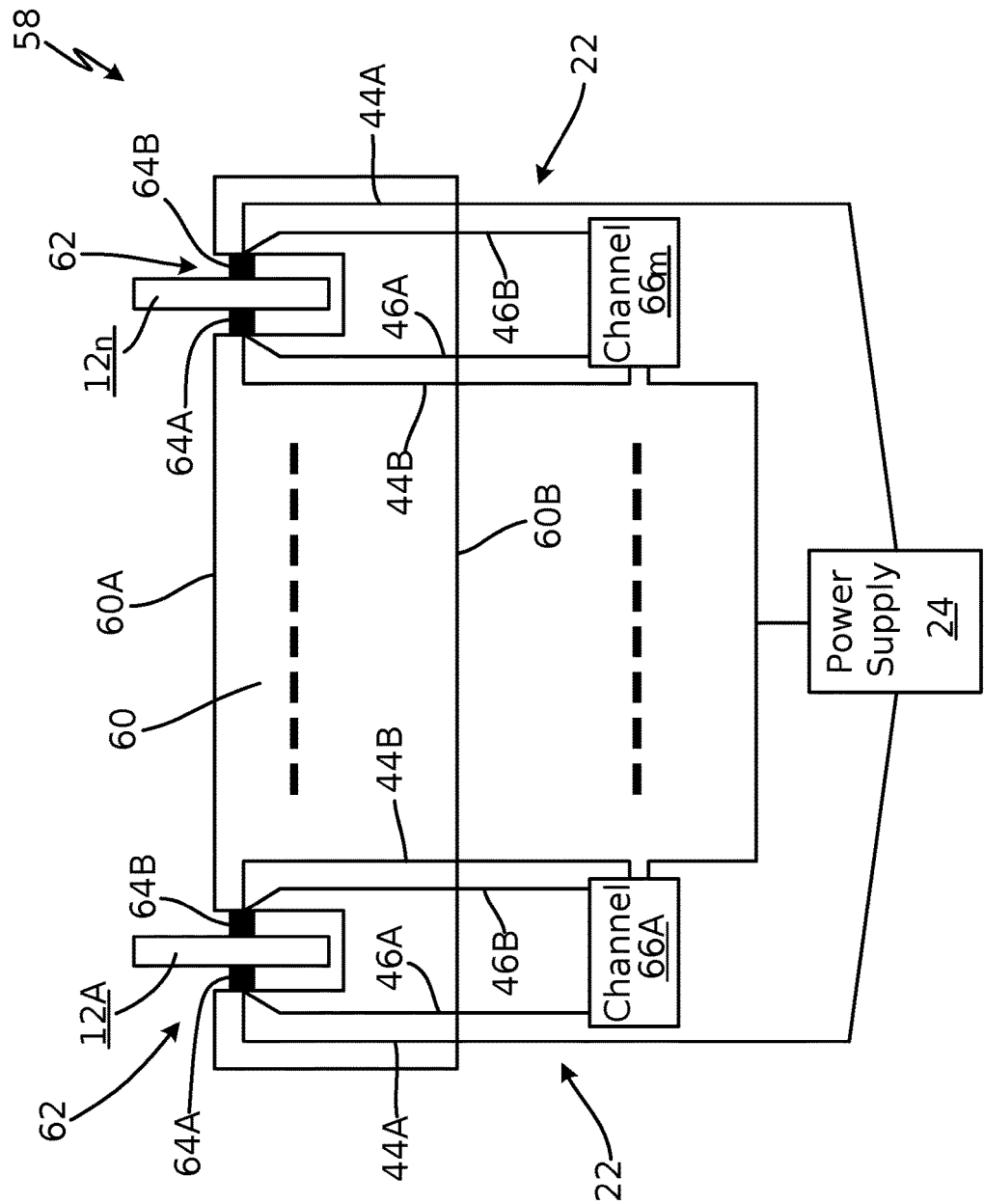
FIG. 1B is a schematic view of a fixture useful for housing one or more thermistors during a power output test that uses a four-wire connection.

System 10 can include fixture 58, an example of which is schematically shown in FIG. 1B. Fixture 58 can be adapted to determine a power output of a single thermistor 12, or multiple thermistors 12 at one time. Fixture 58 includes body 60 bound between surfaces 60A and 60B arranged on opposite sides of body 60. Protruding into body 60 from one of surfaces 60A and 60B is receiving portion 62 which is shown as a slot extending inward from an upper surface 60A of body 60 in this case. However, in other embodiments, fixture 58 may include protrusions extending from body 60, or a portion of body 60, and can be spaced such that a gap defined between adjacent protrusions define receiving portion 62. Within receiving portion 62, contacts 64A and 64B are spaced to engage opposing surfaces 42A and 42B of thermistor 12. Leads 44A and 46A extend from contact 64A, and leads 44B and 46B extend from contact 64B, each lead connecting one of contacts 64A and 64B to power meter 20, power supply 24, or both as described previously in reference to system 10. Accordingly, by inserting thermistor 12 into receiving portion 62, contacts 64A and 64B engage opposite surfaces 42A and 42B of thermistor 12, retaining thermistor 12 within fixture 58 and connecting thermistor 12 to power meter 20 and power supply 24. Additionally, body 60 of fixture may be constructed to interface with container 40, suspending a portion of fixture 58 and one or more thermistors 12 within medium 16.

Fixture 58 may be adapted to house multiple thermistors 12 so that power outputs of multiple thermistors 12 can be determined during one test. In this case, fixture 58 is equipped with an arbitrary number of receiving portions 62 as indicated by subscript "m", each receiving portion 62 including contacts 64A and 64B, each pair of contacts engaging one of multiple thermistors 12 retained within fixture 58. Further, each pair of contacts 64A and 64B may connect to one of the thermistors 12 to a switching device, which in turn connects one of the thermistors 12 at a time to a single power meter 20 and power supply 24. In other examples, each pair of contacts 62A and 64B may connect one of the thermistors 12 to a separate power meter 20 and/or power supply 24. However, in other instances, power meter 20 may be equipped with multiple channels 66A up to at least channel $66_m$ such that each thermistor 12 connects to one of channels 66A to $66_m$ via a discrete four-wire connection 22 comprising leads 44A, 44B, 46A, and 46B as previously described. Further, in lieu of separate power supplies 24, a single power supply 24 can be used. In still other embodiments, thermistors 12 can be subdivided into groups, each group connected to a separate power supply 24.

Utilizing four-wire connection 22, whether measuring a single thermistor or multiple thermistors, increases measurement accuracy of thermistor voltage by eliminating resistance of the leads and is particularly useful for determining output power of thermistors supplied with a relatively low voltage (e.g., 28V) in comparison to the thermistor current. Certain thermistors 12 can be supplied with a relatively high voltage (e.g., 115V) relative to the thermistor current. For these high-voltage thermistors, four-wire connection 22 can be replaced with two-wire connection 68 as shown in FIGS. 2A and 2B.

Figure 2A:
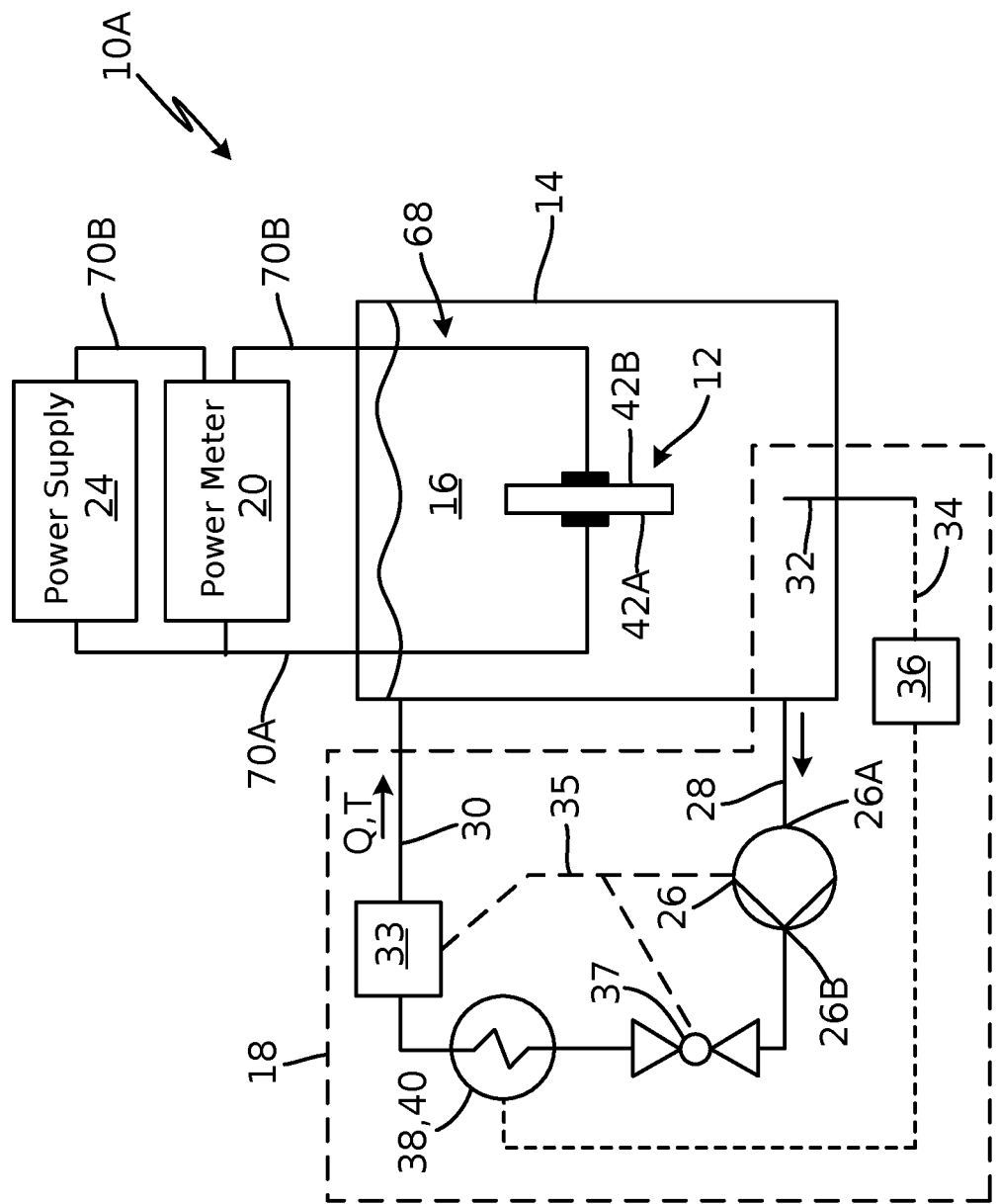
FIG. 2A is a schematic view of a system capable of implementing a test methodology for determining the power output of a thermistor using a two-wire connection.

As depicted in FIG. 2A, system 10A includes the same components and functions in a similar manner to system 10 depicted in FIG. 1A with the following exceptions. Instead of four-wire connection 22, two-wire connection 68 electrically connects thermistor 12 to power meter 20 and power supply 24 via leads 70A and 70B. Lead 70A electrically connects power supply 24 to surface 42A of thermistor 12, and lead 70B electrically connects power supply 24 to surface 42B of thermistor 12 such that, in operation, power supply 24 applies supply voltage $V_s$ to thermistor 12. Power meter 20 is electrically connected in-line along lead 70B to measure current I of thermistor 12 and is electrically connected between leads 70A and 70B to measure voltage V of thermistor 12 when thermistor 12 is energized by power supply 24.

Figure 2B:
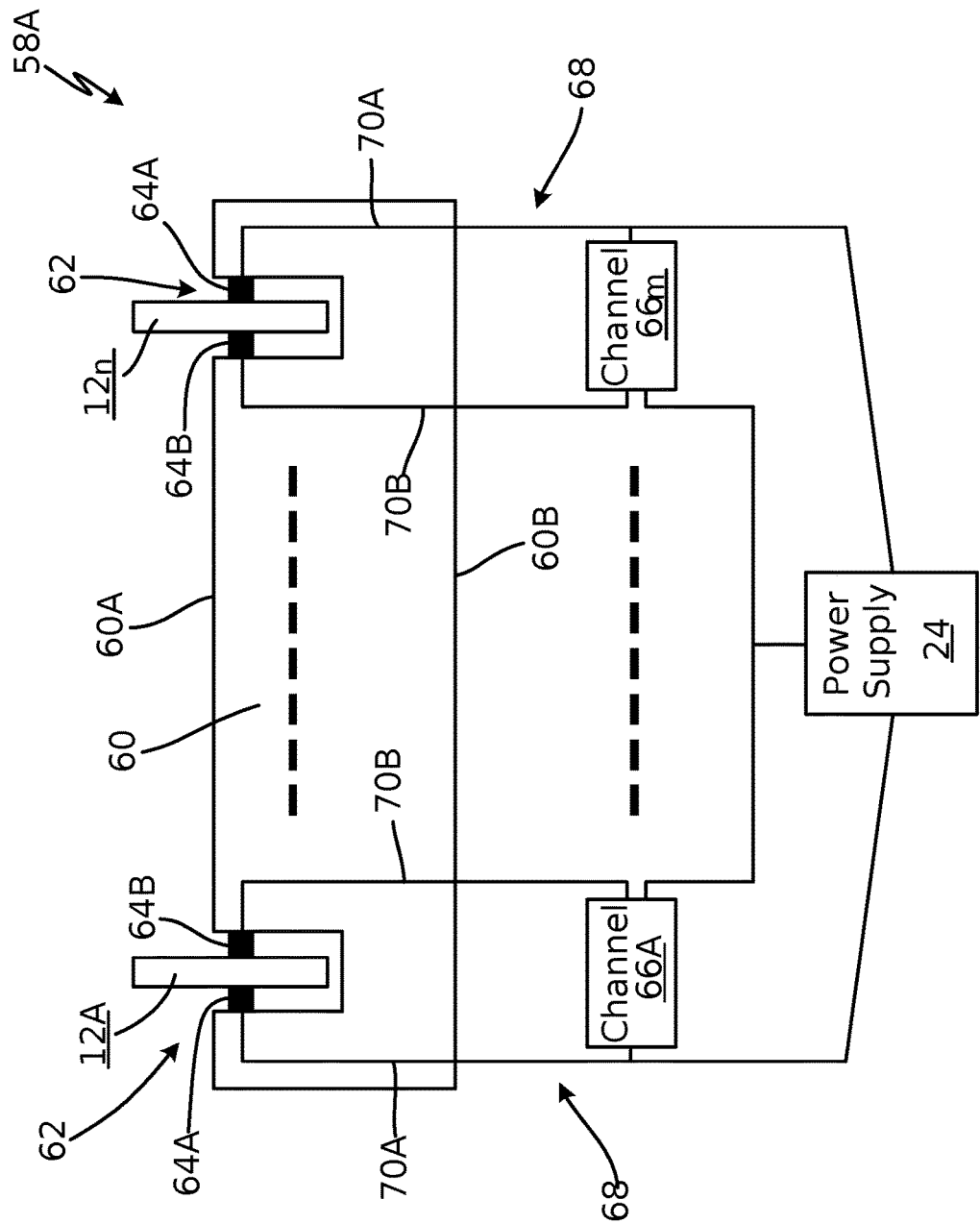
FIG. 2B is a schematic view of a fixture useful for housing one or more thermistors during a power output test that uses a two-wire connection.

FIG. 2B depicts two-wire connections 68 implemented in fixture 58A and includes components depicted in FIG. 1B that function in a similar way to fixture 58 equipped with four-wire connection 22 except two-wire connections 68 are used to electrically connect thermistors 12A to $12_n$ to respective channels 66A through $66_m$ and one or more power supplies 24. Accordingly, leads 70A and 70B of each two-wire connection 68 electrically connect one of thermistors 12A-$12_n$ to power supply 24 for applying supply voltage $V_s$. Further, each channel 66A through $66_m$ is electrically connected in-line to lead 70B of one of thermistors 12A-$12_n$ to measure thermistor current I and is electrically connected between leads 70A and 70B of the same thermistor to measure thermistor voltage V.

Figure 3:
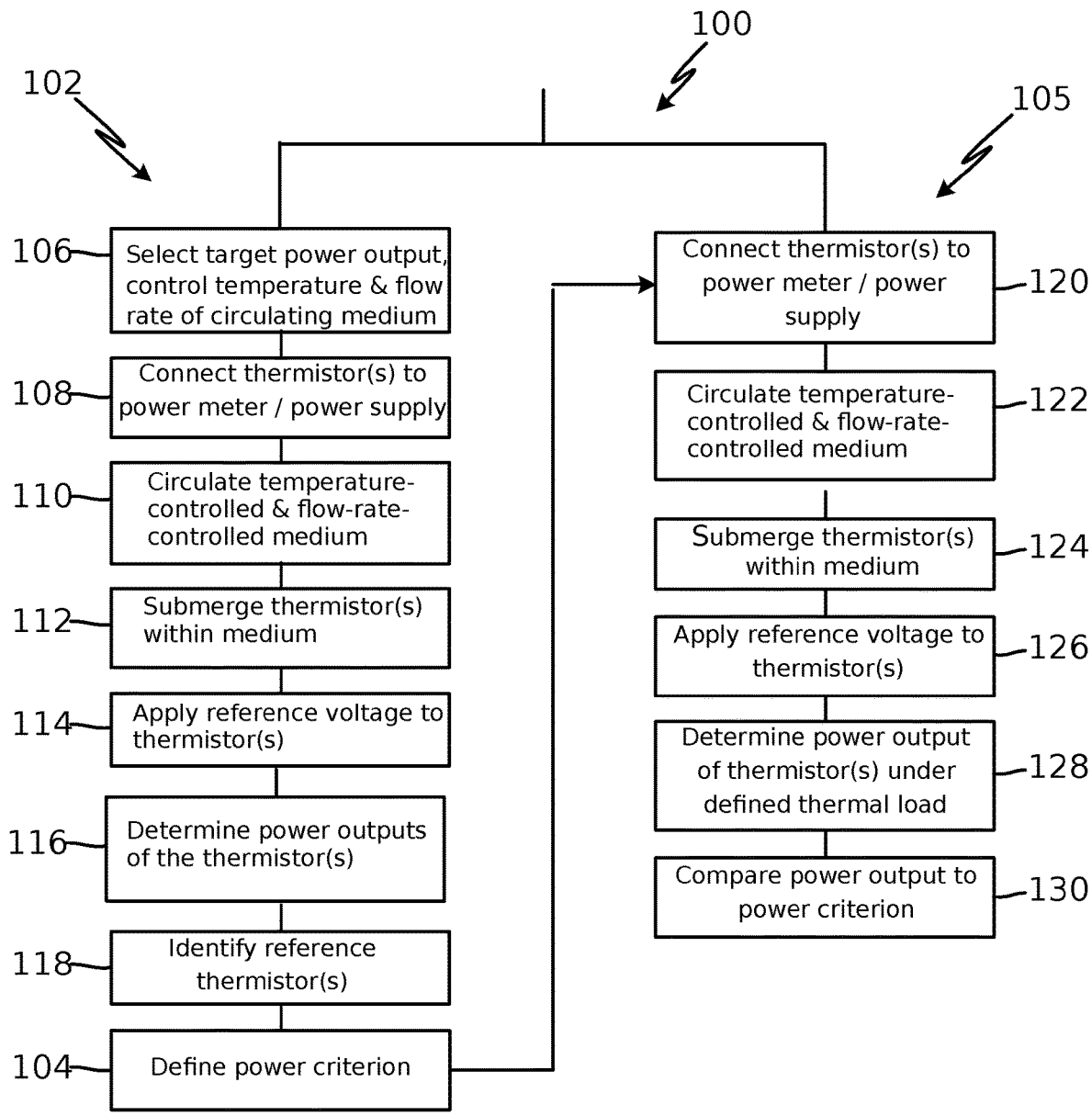
FIG. 3 is a flow chart describing steps of a test methodology for determining the power output of a thermistor.

FIG. 3 is a flow chart describing steps of methodology 100 to determine a power output of thermistor 12 under a defined thermal load and using system 10. Methodology 100 can include subroutine 102 for determining power criterion 104 for thermistor 12 under a thermal load as well as, or alternatively, subroutine 105 for evaluating thermistor 12 with respect to power criterion 104. The sequence depicted by FIG. 3 is for illustrative purposes only and is not meant to limit method 100 in any way as it is understood that the portions of method 100 can proceed in a different logical order, additional or intervening portions can be included, or described portions of method 100 can be divided into multiple portions, or described portions of the method can be omitted without detracting from the method described below.

Power criterion subroutine 102 includes steps 106, 108, 110, 112, 114, 116, and 118 and relates power output of reference thermistor $12_{ref}$ while under thermal load L to power output of a subsequently tested thermistor 12.

In step 106, a target power output for thermistor 12 is selected. The target power output can be selected based on a known temperature-dependent electrical resistance characteristic of thermistor 12 in view of thermal load L and an expected supply voltage $V_s$. In other instances, target power output can be selected based on a distribution of power outputs typical of the manufacturing process used to produce thermistors 12. For example, the target power output may be selected as a minimum power output such that most thermistors produced by a particular process are found to be acceptable, for example, greater than 90% of thermistors within a batch. In other instances, higher thermal loads may require more selective processes whereby a lesser percentage of thermistors are found to be acceptable.

In steps 108, 110, 112, and 114 one or more reference thermistors $12_{ref}$ are selected from a group of thermistors 12 by evaluating power output from each thermistor 12. The number of thermistors within this group necessary to represent manufacturing and/or performance variations of the thermistors varies depending on the specific thermistor composition, the manufacturing process, and the thermistors contribution to an overall thermistor assembly. Typically, a group size of between 10 thermistors and 1000 thermistors will sufficiently represent manufacturing and/or performance variations of a particular thermistor and manufacturing process, although a group consisting of more or less thermistors may also be acceptable depending on the thermistor composition, associated manufacturing process, and operation under thermal load L.

In step 108, each thermistor 12 from the group of thermistors is connected to power meter 20 and power supply 24 using four-wire connection 22 as described in system 10 or using two-wire connection 68 as described in system 10A. In instances where batch processing of thermistors 12 is desired, thermistors 12A up to thermistors $12_n$ from the group of thermistors can be connected to individual measurement channels 66 of power meter 20, or an equal number of separate power meters 20, as well as to one or more power supplies 24. In step 110, medium 16 is circulated through container 14 at a controlled flow rate Q and controlled to medium temperature T, which are selected to be represented of an expected thermal load L. Subsequently, one or more thermistors 12 and, optionally, at least a portion of fixture 58 are submerged within medium 16 in step 112, each thermistor 12 immersed in medium 16 controlled to the same temperature and flow rate setpoints. A reference voltage $V_{ref}$ corresponding to the target power output determined in step 106 is applied to thermistor 12 or to each of thermistors 12A-$12_n$ in step 114, and the power output of thermistor 12 or the power outputs of thermistors 12A-$12_n$ are determined by power meter 20 or power meter channels 66A-66m in step 116. Steps 108, 110, 112, 114, and 116 are repeated until the power output of each thermistor 12 within the group of thermistors is determined. In step 118, one or more reference thermistors $12_{ref}$ are identified based on a comparison of respective power outputs of thermistors 12 to the target power output. One or more reference thermistors $12_{ref}$ are identified as thermistors having a power output equal to at least the target power output and no more than 1% to 10%, of the target power output. The power output of reference thermistor $12_{ref}$ becomes the power output criterion 104 for testing subsequent thermistors 12 of the same composition and manufactured by the same process. Furthermore, temperature T and flow rate Q of medium 16 delivered to container 14 becomes the medium temperature and flow rate temperature setpoints for subsequent testing.

After establishment of power output criterion 104, subsequently manufactured thermistors can be evaluated using subroutine 105 of methodology 100. Subroutine 105 includes steps 120, 122, 124, 126, 128, and 130. In step 120, thermistor 12 is connected to power meter 20 and power supply 24 via four-wire connection 22 as described in system 10 or using two-wire connection 68 as described in system 10A. In step 122, medium 16 is circulated through container 14 at controlled flow rate Q and controlled to medium temperature T determined by subroutine 102. Subsequently, one or more thermistors 12 and, optionally, at least a portion of fixture 58 are submerged within medium 16 in step 124. Next, power supply 24 provides constant reference voltage $V_{ref}$ determined in step 114 to one or more thermistors 12 in step 126. In step 128, power meter 20 measures electrical current I and voltage V of each thermistor 12, and power output P of each thermistor 12 is determined and recorded using power meter 20. In step 130, the determined power output P of each thermistor 12 is compared to power criterion 104 determined in step 118 in order to classify thermistor 12 as acceptable or not acceptable for operation under the thermal load L. If power output P of thermistor 12 equals or exceeds power criterion 104, thermistor 12 is acceptable for operation under thermal load L, and if power output P of thermistor 12 is less than power criterion 104, thermistor 12 is not acceptable for operation under thermal load L.

DISCUSSION OF POSSIBLE EMBODIMENTS

The following are non-exclusive descriptions of possible embodiments of the present invention.

A method according to an exemplary embodiment of this disclosure, among other possible things includes circulating a medium through a container, controlling a temperature of the medium delivered to the container, controlling a flow rate of the medium delivered to the container, and submerging a thermistor within the medium. The method further includes determining a power output of the thermistor while the thermistor is submerged within the medium and the medium circulates through the container and classifying the thermistor based on a comparison between the determined power and a power criterion.

The method of the preceding paragraph can optionally include, additionally and/or alternatively, any one or more of the following features, configurations, additional components, and/or steps.

A further embodiment of the foregoing method, wherein circulating the medium through the container can include controlling a temperature of the medium to a temperature setpoint.

A further embodiment of any of the foregoing methods, wherein circulating the medium through the container can include controlling the temperature of the medium to within 10% of the temperature setpoint.

A further embodiment of any of the foregoing methods, wherein circulating the medium through the container can include controlling the temperature of the medium to within 5% of the temperature setpoint.

A further embodiment of any of the foregoing methods, wherein circulating the medium through the container can include controlling the temperature of the medium to within 1% of the temperature setpoint.

A further embodiment of any of the foregoing methods, wherein circulating the medium through the container can include controlling a flow rate of the medium to a flow rate setpoint.

A further embodiment of any of the foregoing methods, wherein circulating the medium through the container can include controlling a flow rate of the medium to within 10% of a flow rate setpoint.

A further embodiment of any of the foregoing methods, wherein circulating the medium through the container can include controlling a flow rate of the medium to within 5% of a flow rate setpoint.

A further embodiment of any of the foregoing methods, wherein circulating the medium through the container can include controlling a flow rate of the medium to within 1% of a flow rate setpoint.

A further embodiment of any of the foregoing methods, wherein determining the power output of the thermistor can include applying a constant voltage to the thermistor.

A further embodiment of any of the foregoing methods, wherein determining the power output of the thermistor can include measuring the current passing through the thermistor while applying the constant voltage to the thermistor.

A further embodiment of any of the foregoing methods, wherein determining the power output of the thermistor includes attaching a four-wire connection to the thermistor in which a first pair of leads measures voltage at the thermistor and a second pair of leads measures the electrical current at the thermistor contemporaneously with measuring the voltage to the thermistor via the first pair of leads.

A further embodiment of any of the foregoing methods can include submerging a reference thermistor within the medium.

A further embodiment of any of the foregoing methods can include determining a reference power output of the reference thermistor while the reference thermistor is submerged within the medium and the medium circulates through the container.

A further embodiment of any of the foregoing methods can include determining the power criterion based on the reference power output of the reference thermistor.

A further embodiment of any of the foregoing methods can include submerging each second thermistor from a plurality of second thermistors within the medium.

A further embodiment of any of the foregoing methods can include determining a power output of each second thermistor from the plurality of second thermistors while each second thermistor is submerged within the medium and the medium circulates through the container.

A further embodiment of any of the foregoing methods can include selecting a reference thermistor from the plurality of second thermistors based on a target power output within a distribution of power outputs of the second thermistors.

A further embodiment of any of the foregoing methods wherein the target power output can be indicative of a subset of second power outputs within the distribution of second power outputs that is less than at least 90% of second power outputs within the distribution of second power outputs.

A further embodiment of any of the foregoing methods wherein the thermistor is a positive temperature coefficient resistor.

A further embodiment of any of the foregoing methods wherein circulating the medium through the container can include circulating a fluid with a thermal conductivity of 0.03 W/m-K or greater.

A further embodiment of any of the foregoing methods wherein circulating the medium through the container can include circulating a fluid with a dielectric strength of 20 kV or greater across a 2.54 millimeter gap.

A method according to another exemplary embodiment of this disclosure, among other possible things includes circulating a medium through a container, controlling a temperature of the medium delivered to the container, controlling a flow rate of the medium delivered to the container, and submerging a plurality of thermistors within the medium. The method further includes determining a power output of each thermistor of the plurality of thermistors while the plurality of thermistors is submerged within the medium and the medium circulates through the container and classifying each thermistor of the plurality of thermistors based on a comparison between the determined power output and a power criterion.

The method of the preceding paragraph can optionally include, additionally and/or alternatively, any one or more of the following features, configurations, additional components, and/or steps.

A further embodiment of the foregoing method can include installing each thermistor of the plurality of thermistors within a receiving portion of a fixture.

A further embodiment of any of the foregoing methods can include submerging the plurality of thermistors and the receiving portion of the fixture within the medium.

A further embodiment of any of the foregoing methods, wherein installing each thermistor of the plurality of thermistors within the receiving portion of the fixture can include attaching a plurality of four-wire connections to the plurality of thermistors.

A further embodiment of any of the foregoing methods wherein each four-wire connection of the plurality of four-wire connections includes a first pair of leads measuring voltage at one of the plurality of thermistor s and a second pair of leads measuring current at the one of the plurality of thermistors.

A further embodiment of any of the foregoing methods, wherein each four-wire connection of the plurality of four-wire connections can attach to one of the plurality of thermistors by inserting the one thermistor into the receiving portion of the fixture.

A further embodiment of any of the foregoing methods can include submerging a reference thermistor within the medium.

A further embodiment of any of the foregoing methods can include determining a reference power output of the reference thermistor while the reference thermistor is submerged within the medium and the medium circulates through the container.

A further embodiment of any of the foregoing methods can include determining the power criterion based on the reference power of the thermistor.

A further embodiment of any of the foregoing methods, wherein determining the power output of the thermistor includes attaching a two-wire connection to the thermistor.

A method according to another exemplary embodiment of this disclosure, among other possible things includes circulating a medium through a container, controlling a temperature of the medium delivered to the container, controlling a flow rate of the medium delivered to the container, and submerging a first thermistor within the medium. The method also includes determining a reference power of the first thermistor while the first thermistor is submerged within the medium and the medium circulates through the container. The method includes determining a power criterion based on the reference power output of the first thermistor. The method includes submerging a second thermistor within the medium that is different from the first thermistor and determining power output of the second thermistor while the second thermistor is submerged within the medium and the medium circulates through the container. The method includes classifying the second thermistor based on a comparison between the determined power output and the power criterion.

The method of the preceding paragraph can optionally include, additionally and/or alternatively, any one or more of the following features, configurations, additional components, and/or steps.

A further embodiment of the foregoing method, wherein circulating the medium through the container can include controlling a temperature of the medium to a temperature setpoint.

A further embodiment of any of the foregoing methods, wherein circulating the medium through the container can include controlling the temperature of the medium to within 10% of the temperature setpoint.

A further embodiment of any of the foregoing methods, wherein circulating the medium through the container can include controlling the temperature of the medium to within 5% of the temperature setpoint.

A further embodiment of any of the foregoing methods, wherein circulating the medium through the container can include controlling the temperature of the medium to within 1% of the temperature setpoint.

A further embodiment of any of the foregoing methods, wherein circulating the medium through the container can include controlling a flow rate of the medium to a flow rate setpoint.

A further embodiment of any of the foregoing methods, wherein circulating the medium through the container can include controlling a flow rate of the medium to within 10% of a flow rate setpoint.

A further embodiment of any of the foregoing methods, wherein circulating the medium through the container can include controlling a flow rate of the medium to within 5% of a flow rate setpoint.

A further embodiment of any of the foregoing methods, wherein circulating the medium through the container can include controlling a flow rate of the medium to within 1% of a flow rate setpoint.

A further embodiment of any of the foregoing methods, wherein the first thermistor is one of a group of first thermistors.

A further embodiment of any of the foregoing methods can further include submerging each first thermistor of the plurality of first thermistors within the medium.

A further embodiment of any of the foregoing methods can include determining a power output of each first thermistor from the plurality of first thermistors while each first thermistor is submerged within the medium and the medium circulates through the container.

A further embodiment of any of the foregoing methods can include selecting the first thermistor from the plurality of first thermistors based on a target power output within a distribution of power output of the first thermistors.

A further embodiment of any of the foregoing methods wherein the target power output can be indicative of a subset of third power outputs within the distribution of third power outputs that is less than at least 90% of third power outputs within the distribution of third power outputs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A method comprising:
   circulating a medium through a container;
   controlling a temperature of the medium delivered to the container;
   controlling a flow rate of the medium delivered to the container;
   submerging a thermistor within the medium; and
   determining a power output of the thermistor while the thermistor is submerged within the medium and the medium circulates through the container; and
   classifying the thermistor based on a comparison between the power output of the thermistor and a power criterion.

2. The method of claim 1, wherein the thermistor is a positive temperature coefficient resistor.

3. The method of claim 1, wherein determining the power output of the thermistor includes attaching a two-wire connection to the thermistor.

4. The method of claim 1, wherein the temperature of the medium is controlled to a temperature setpoint.

5. The method of claim 4, wherein the flow rate of the medium is controlled to a flow rate setpoint.

6. The method of claim 1, wherein the thermistor is one of a plurality of thermistors; and wherein the method further comprises:
   submerging each thermistor from the plurality of thermistors within the medium;
   determining the power output of each thermistor from the plurality of thermistors while each thermistor is submerged within the medium and the medium circulates through the container; and
   selecting a reference thermistor from the plurality of thermistors based on a target power output within a distribution of power outputs of the plurality of thermistors; and
   determining the power criterion based on the power output of the reference thermistor.

7. The method of claim 6, wherein the target power output is indicative of a subset of power outputs within the distribution of power outputs that is less than at least 90% of power outputs within the distribution of power outputs.

8. The method of claim 1, wherein determining the power output of the thermistor includes applying a constant voltage to the thermistor.

9. The method of claim 8, wherein determining the power output of the thermistor includes measuring an electrical current at the thermistor while applying the constant voltage to the thermistor.

10. The method of claim 9, wherein determining the power output of the thermistor includes attaching a four-wire connection to the thermistor in which a first pair of leads measures the constant voltage at the thermistor and a second pair of leads measures the electrical current passing at the thermistor contemporaneously with measuring the voltage at the thermistor via the first pair of leads.

11. A method comprising:
    circulating a medium through a container;
    controlling a temperature of the medium delivered to the container;
    controlling a flow rate of the medium delivered to the container;
    submerging a plurality of thermistors within the medium; and
    determining a power output of each thermistor of the plurality of thermistors while the plurality of thermistors is submerged within the medium and the medium circulates through the container; and
    classifying each thermistor of the plurality of thermistors based on a comparison between the power output and a power criterion.

12. The method of claim 11, wherein each four-wire connection of the plurality of four-wire connections attaches to one of the plurality of thermistors by inserting the one thermistor into the receiving portion of the fixture.

13. The method of claim 11, further comprising:
    submerging a reference thermistor within the medium;
    determining a reference power output of the reference thermistor while the reference thermistor is submerged within the medium and the medium circulates through the container; and
    determining the power criterion based on the reference power of the reference thermistor.

14. The method of claim 11, further comprising:
    installing each thermistor of the plurality of thermistors within a receiving portion of a fixture prior to submerging the plurality of thermistors within the medium.

15. The method of claim 14, further comprising: attaching each four-wire connection of a plurality of four-wire connections to one of the plurality of thermistors, and wherein each four-wire connection of the plurality of four-wire connections includes a first pair of leads measuring a voltage at one of the plurality of thermistors and a second pair of leads measuring an electrical current passing at the one of the plurality of thermistors.

16. A method comprising:
    circulating a medium through a container;
    controlling a temperature of the medium delivered to the container;
    controlling a flow rate of the medium delivered to the container;
    submerging a first thermistor within the medium;
    determining a reference power output of the first thermistor while the first thermistor is submerged within the medium and the medium circulates through the container;
    determining a power criterion based on the reference power output of the first thermistor;
    submerging a second thermistor within the medium that is different from the first thermistor;
    determining a second power output of the second thermistor while the second thermistor is submerged within the medium and the medium circulates through the container; and
    classifying the second thermistor based on a comparison between the second power output and the power criterion.

17. The method of claim 16,
wherein the temperature of the medium is controlled to a temperature setpoint; and
wherein the flow rate of the medium is controlled to a flow rate setpoint.

18. The method of claim 16,
wherein the first thermistor is one of a plurality of first thermistors; and
wherein the method further comprises:
- submerging each first thermistor from the plurality of first thermistors within the medium;
- determining a third power output of each first thermistor from the plurality of first thermistors while each first thermistor is submerged within the medium and the medium circulates through the container; and
- selecting the first thermistor from the plurality of first thermistors based on a target power output within a distribution of third power outputs of the first thermistors.

19. The method of claim 18, wherein the target power output is indicative of a subset of third power outputs within the distribution of third power outputs that is less than at least 90% of third power outputs within the distribution of third power outputs.

* * * * *